United States Patent [19]

Smay

[11] Patent Number: 5,692,707

[45] Date of Patent: Dec. 2, 1997

[54] UNIVERSAL SPACECRAFT ATTITUDE STEERING CONTROL SYSTEM

[75] Inventor: John W. Smay, Redondo Beach, Calif.

[73] Assignee: Hughes Aircraft Company, Los Angeles, Calif.

[21] Appl. No.: 441,359

[22] Filed: May 15, 1995

[51] Int. Cl.$^6$ .................................. B64G 1/28; G06G 7/70
[52] U.S. Cl. .......................... 244/165; 244/176; 364/434
[58] Field of Search ............................ 244/164, 165, 244/176, 177, 195; 364/434

[56] References Cited

U.S. PATENT DOCUMENTS

| | | | |
|---|---|---|---|
| 3,741,500 | 6/1973 | Liden | 244/165 |
| 3,999,729 | 12/1976 | Muhlfelder et al. | 244/165 |
| 4,723,735 | 2/1988 | Eisenhaure et al. | 244/165 |
| 4,735,382 | 4/1988 | Pinson | 244/165 |
| 5,042,753 | 8/1991 | Atlas | 244/165 |
| 5,112,012 | 5/1992 | Yuan et al. | 244/165 |
| 5,261,631 | 11/1993 | Bender | 244/165 |
| 5,315,158 | 5/1994 | Danielson | 244/165 |

FOREIGN PATENT DOCUMENTS

0392130  10/1990  European Pat. Off. .............. 244/165

*Primary Examiner*—Andres Kashnikow
*Assistant Examiner*—Virna Lissi Mojica
*Attorney, Agent, or Firm*—Elizabeth E. Leitereg; Terje Gudmestad; Wanda K. Denson-Low

[57] ABSTRACT

A method and system of attitude steering and momentum management for a spacecraft suitable over a wide range of orbit altitude and inclination parameters and a similar wide range of mission steering profiles is provided. The system utilizes two active momentum wheels positioned with their spin axes nominally coaligned on the spacecraft pitch axis. Each wheel is pivoted by jackscrew type mechanisms which allow the angular momentum to be tilted (e.g. within the range 0–45° from the nominal alignment with respect to the spacecraft body). The spacecraft control processor generates wheel torque commands for the wheel speed electronics and jackscrew drive commands for the platform assemblies in order to adjust the speed and amount of tilt of the momentum wheels. The invention provides a two-momentum wheel array that allows use of either momentum bias steering or large angle zero-momentum steering and accommodates multiple orbit geometries and varying degrees of attitude steering agility.

12 Claims, 4 Drawing Sheets

UNIVERSAL SPACECRAFT ATTITUDE STEERING CONTROL SYSTEM

TECHNICAL FIELD

The present invention relates to spacecraft control, and more specifically to a momentum wheel system for securing multiple orbit geometries and improved attitude steering agility.

BACKGROUND OF THE INVENTION

Various systems of attitude steering and momentum management for spacecraft are known today. These spacecraft use different systems of momentum wheel arrays for various orbit geometries and mission purposes.

Prior momentum bias spacecraft are predominately geosynchronous orbit applications. For orbit normal steering, these spacecraft have used thrusters, multiple V-wheel arrays, and/or reaction wheel augmentation of the momentum wheel for roll-yaw steering. Examples of such designs include the Intelsat V and TDRS I. These spacecraft are not used for zero-momentum agile steering applications. Instead, significantly different attitude control architectures employing arrays of three or more active reaction wheels are typically used for these zero-momentum semi-agile applications. Examples of these spacecraft are the GPS, Landsat and Hubble satellites. Known spacecraft having these systems are shown, for example, in U.S. Pat. Nos. 4,723,735 and 3,741,500.

Spacecraft are unknown today which utilize common spacecraft hardware components for fundamentally different attitude control concepts, such as momentum-bias and zero-momentum steering over a wide variety of geosynchronous orbits, and low altitude elliptical and inclined orbits.

SUMMARY OF THE INVENTION

It is an object of the present invention to provide an improved spacecraft attitude steering and momentum management system. It is another object of the present invention to provide a spacecraft attitude steering and momentum management system which can be used for a wide variety of missions and orbits.

It is still another object of the present invention to provide a spacecraft attitude control design which facilitates use of common spacecraft hardware components for different attitude control concepts. It is a still further object of the present invention to reduce spacecraft cost by utilizing common control system architecture, hardware design and components for a wide range of missions and orbit geometries.

It is also an object of the present invention to provide a spacecraft for momentum bias steering or large angle zero-momentum steering which accommodates multiple orbit geometries and varying degrees of attitude steering agility.

These and other objects and purposes are met by the unique method and system of the present invention. The present invention provides a method and system of attitude steering and momentum management for a spacecraft suitable over a wide range of orbit altitude and inclination parameters and a similar wide range of mission steering profiles. In particular, the present invention provides a momentum wheel array that allows use of either momentum bias steering or large angle zero-momentum steering and therefore accommodates multiple orbit geometries and varying degrees of attitude steering agility. The present invention utilizes two active momentum wheels, rather than three or more active wheels as required in typical zero-momentum reaction wheel pyramid arrays.

The two active momentum wheels are positioned with their spin axes nominally co-aligned on the spacecraft pitch axis and are spun in the opposite or the same direction at differential or equal speeds to store spacecraft momentum as desired for the particular application or mission phase. Each wheel is gimbaled about two axes orthogonal to its spin axis, or mounted on a two-degree-of-freedom flexible pivot, allowing its angular momentum to be tilted from the nominal alignment with respect to the spacecraft body.

The method and system of the present invention facilitates the use of identical spacecraft hardware components with fundamentally different attitude control concepts, such as momentum-bias and zero-momentum steering over a wide variety of geosynchronous, and low altitude elliptical and inclined orbits, using complex steering laws such as sun-nadir steering.

The present invention allows one spacecraft attitude control design to perform a wide variety of missions from geosynchronous communications or weather observation, to low altitude Earth resource observation. The present invention reduces spacecraft costs substantially by allowing the use of common control system architecture, hardware design, components, flight software, flight procedures and ground test and simulation support over a wide range of missions for which current technology employs many mission unique designs. The present invention could reduce the cost of an altitude control system development by 50% or more, as well as allowing more efficient volume production and test of a common attitude control system for all missions.

Other objects, features and advantages of present invention will become apparent from the following description of the invention when viewed in accordance with the attached drawings and appended claims.

BEST MODE FOR CARRYING OUT THE INVENTION

Figure 1:
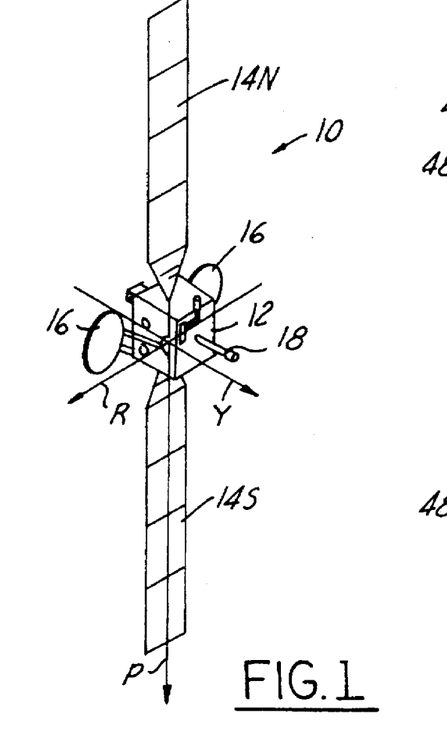
FIG. 1 shows a three-axis stabilized satellite to illustrate the improved system in accordance with the present invention.

FIG. 1 illustrates a three-axis stabilized satellite or spacecraft 10. The spacecraft is preferably situated in a stationary orbit about the Earth. The satellite has a main body 12, a pair of solar panels 14, a pair of high gain narrow beam antennas 16, and a telemetry and command omni-directional antenna 18 which is aimed at a control ground station. Since the solar panels are often referred to by the designations "North" and "South", the solar panels in FIG. 1 are referred to by the numerals 14N and 14S for the "North" and "South" solar panels, respectively.

The three axes of the spacecraft 10 are shown in FIG. 1. The pitch axis P is substantially vertical and lies along the plane of the solar panels 14N and 14S. The roll axis R and yaw axis Y are perpendicular to the pitch axis P and lie in the directions and planes shown. The antenna 18 points to the Earth along the yaw axis Y.

Figure 2:
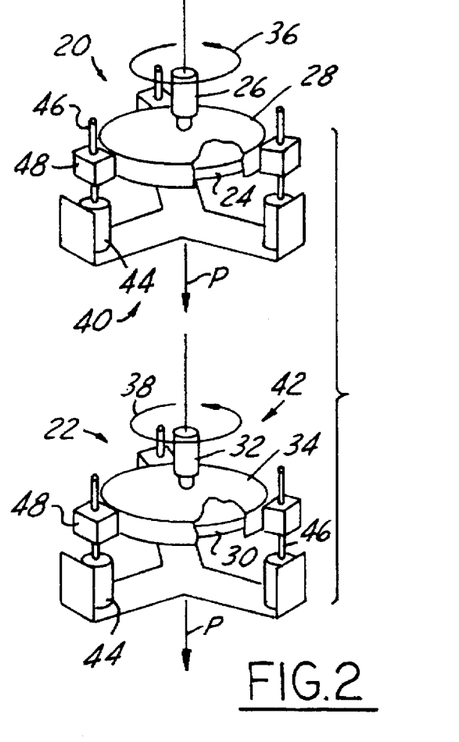
FIG. 2 illustrates a schematic view of a pair of gimbaled momentum wheels in accordance with the present invention.

The momentum for the spacecraft 10 is achieved by a pair of gimbaled momentum wheel members 20 and 22. These are shown in FIG. 2. The momentum members 20 and 22 are disposed within the body 12 of the spacecraft 10 and are positioned with their spin axes parallel to each other and coaligned with the spacecraft pitch axis P.

Even though in accordance with the present invention, the two momentum wheels are positioned with their spin axes nominally coaligned along the spacecraft pitch axis, it is understood that the momentum wheels could be coaligned along another axis of the spacecraft and still perform in a similar manner in accordance with the present invention. Also, the present invention utilizes two active momentum wheels and this is referred to as a "two-wheel array". A third inactive momentum wheel (not shown) may exist in the spacecraft in standby redundancy to achieve the required reliability if necessary, but this is not a required part of the present invention.

The momentum wheel member 20 includes a momentum flywheel 24 which is mounted on a shaft 26 within a housing 28. Similarly, momentum member 22 includes a momentum wheel 30 mounted on a shaft 32 within a housing 34. The momentum wheels 24 and 30 may be mechanically or magnetically supported and rotated about the axes of the shafts 26 and 32 as indicated by the curved arrows 36 and 38.

The two momentum wheels 24 and 30 are spun in the opposite or the same direction at differential or equal speeds to store spacecraft momentum as desired for the particular application or mission phase. Each wheel 24 and 30 is gimbaled about two axes orthogonal to a spin axis, as known in the art, or mounted on a two-degree-of-freedom flexible pivot arrangement 40 and 42. Each pivot arrangement 40 and 42 includes a plurality of stepper motors 44 and associated jackscrews 46. The housings 28 and 34 include a plurality of flanges 48 each having a threaded hole for engagement with an associated jackscrew 46. This arrangement allows the angular momentum of the wheel to be tilted from the nominal alignment with respect to the spacecraft body. In accordance with a practical application of the present invention, the angular momentum may be tilted between 0 and 45 degrees (although the invention is not limited to this range). Jackscrew mechanisms which could be used in accordance with the present invention are found, for example, in U.S. Pat. No. 5,112,012.

With limited angular travel of 45° or less in accordance with a two-wheel array, most of the versatility of a control moment gyro (CMG) array is achieved, while avoiding the classical control torque singularity problems. Classical CMGs use spinning momentum wheels mounted in rotatable gimbals with continuous drive motors which can be rotated 90° or more. When CMGs are rotated through large angles to generate torque, sometimes an undesirable situation develops which has a "zero" net torque.

Classical CMGs can be rotated in virtually any direction and virtually any angle and do not use jackscrew type control mechanism. The gimbals are expensive and heavy, however, and are not very durable. As mentioned earlier, the present jackscrew arrangement, in accordance with the present invention, creates a stiff mounting for the momentum wheels, thus creating a limited rotation for the array. This creates a situation similar to a limited rotation of a stiff high torque gimbaling apparatus. The present jackscrew arrangement still allows the system to turn or rotate the spacecraft at large angles. It is not necessary, however, to spin the wheels or turn the spacecraft at a fast rate.

The mechanical advantage provided by jackscrew mechanisms facilitates the use of smaller drive motors than those utilized for traditional dual gimbaled mounts. The jackscrew drives also provide a stiff and high torque interface between the momentum wheel and spacecraft in the static axis while the other axis is being driven. This results in a double gimbaled control moment gyro (DGCMG) that is free of the classical disadvantage of a standard DGCMG, that is that the torque motor in the second axis must react the large torque being applied to the spacecraft. If one jackscrew is operated, it produces a large torque similar to a single gimbal CMG. When the second jackscrew is operated 90° from the first jackscrew, an effect is achieved in the first axis securing a high torque application.

A single momentum wheel spacecraft cannot secure the benefits and advantages of the present invention. For example, the current Hughes HS 601 spacecraft currently utilizes a single gimbaled momentum wheel in a geosynchronous orbit momentum bias operation. The use of a two-momentum wheel array in accordance with the present invention, facilitates selection of other nominal speeds and gimbal control scenarios and provides accommodation of many varied orbit and steering geometries.

In particular, the present invention provides a system and method of attitude steering and momentum management for a spacecraft suitable over a wide range of orbit altitude and inclination parameters in a similar wide range of mission steering profiles. The two momentum wheel array facilitates flying identical spacecraft hardware components using fundamentally different attitude control concepts, such as momentum-bias and zero-momentum steering over a wide variety of geosynchronous, and low altitude elliptical and inclined orbits, using complex steering laws such as sun-nadir steering.

The present system and method allows the use of one spacecraft attitude control design to perform a wide variety of missions from geosynchronous communications or weather observation, to low altitude Earth resource observation. This system reduces spacecraft cost substantially by allowing the use of common control system architecture, hardware design, components, flight software, flight procedures and ground test and simulation support over a wide range of missions for which current technology employs many different designs. The present invention can conceivably reduce the cost of a new attitude control system development by over 50%, as well as allowing more efficient volume production and test of a common attitude control for all missions.

The present invention eliminates the need to design entirely new three or four-wheel pyramid arrays, new control algorithms and a whole new spacecraft for a zero-momentum bias system. The invention accommodates large movements of a spacecraft and varying degrees of attitude steering agility.

As indicated above, the present invention utilizes two momentum wheels that are mounted parallel to each other and to the spacecraft pitch axis, as indicated in FIGS. 1 and 2. The functional architecture of a representative attitude control system is shown in a block diagram in FIG. 3.

Figure 3:
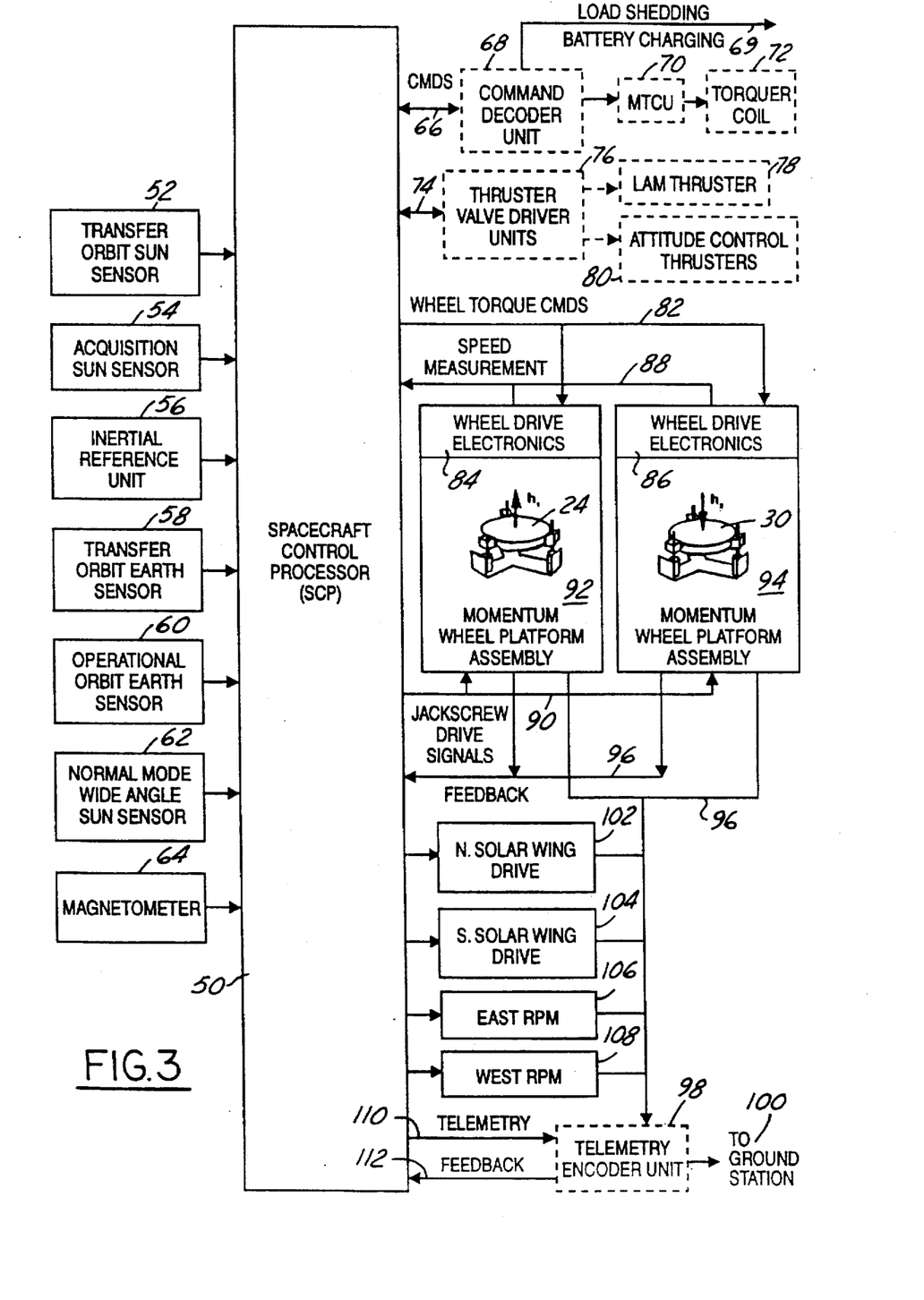
FIG. 3 illustrates a block diagram of a representative zero-momentum agile attitude control system in accordance with the present invention.

As shown in FIG. 3, the control of the spacecraft is generated by a computer or spacecraft control processor (SCP) 50. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active notation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms control could include solar panel control and reflector positioning control. The spacecraft control systems support could include tracking and command processing, battery charge management and pressure transducer processing.

Input to the spacecraft control processor 50 comes from a number of spacecraft components and subsystems, such as a transfer orbit sun sensor 52, an acquisition sun sensor 54, an inertial reference unit 56, a transfer orbit Earth sensor 58, an operational orbit Earth sensor 60, a normal mode wide angle sun sensor 62, and a magnetometer 64.

The SCP 50 generates control signal commands 66 which are directed to a command decoder unit 68. The command decoder unit operates the load shedding and battery charging systems 69. The command decoder unit also sends signals to the magnetic torque control unit (MTCU) 70 and the torque coil 72.

The SCP 50 also sends control commands 74 to the thruster valve driver unit 76 which in turn controls the liquid apogee motor (LAM) thrusters 78 and the attitude control thrusters 80.

Wheel torque commands 82 are generated by the SCP and are communicated to the wheel speed electronics 84 and 86. These effect changes in the wheel speeds for wheels 24 and 30, respectfully. The wheels can be spun at the same or different rates and in the same or different directions. The speed of the wheels 24 and 30 is also measured and fed back to the SCP by feedback control signal 88.

The spacecraft control processor also sends jackscrew drive signals 90 to the platform assemblies 92 and 94 for the momentum wheels 24 and 30, respectively. These signals control the operation of the jackscrews individually and thus the amount of tilt of the momentum wheels. The position of the jackscrews is then fed back through command signal 96 to the spacecraft control processor. The signals 96 are also sent to the telemetry encoder unit 98 and in turn to the ground station 100.

The SCP 50 further sends control commands to the North solar wing drive 102 and the South solar wing drive 104, as well as the East reflector positioning mechanism (RPM) 106 and the West RPM 108. The positioning of the two solar wings and the two reflectors is also fed to the telemetry encoder unit 98, and in turn to the ground station 100. The SCP communicates with the solar wing drives 102 and 104 for appropriate positioning of solar panels 14N and 14S so as to properly manage energy storage and retrieval.

The spacecraft control processor also sends command signals 110 to the telemetry encoder unit 98 which in turn sends feedback signals 112 to the SCP. This feedback loop, as with the other feedback loops to the SCP described earlier, assist in the overall control of the spacecraft. The SCP communicates with the telemetry encoder unit 98, which receives the signals from various spacecraft components and subsystems indicating current operating conditions, and then relays them to the ground station 100.

The wheel drive electronics 84, 86 receive signals from the SCP and control the rotational speed of the momentum wheels. As indicated above, the wheels can be driven in either the same direction or in the opposite direction, as required, and at the same or different speeds. The jackscrew drive signals 90 adjust the orientation of the angular momentum vector of the wheels 24 and 30. This accommodates varying degrees of attitude steering agility and accommodates movement of the spacecraft as required.

Two basic spacecraft functions are accomplished simultaneously by the present invention. First, spacecraft attitude steering torques are provided by commanding acceleration about the wheel spin axis (pitch), and by torquing the transverse gimbal axis (roll/yaw). This accommodates large angle zero-momentum steering. Second, momentum management, primarily storage of momentum accumulated through environmental disturbance torques, is provided by adjusting the differential speed of the two momentum wheels about their spin axes and by appropriately tilting one, or both, of the wheels about the transverse axis. Large changes in momentum can be effected by spinning both wheels in the same direction. This momentum management is achieved in both large momentum bias steering and in large angle zero-momentum steering.

Figure 4:
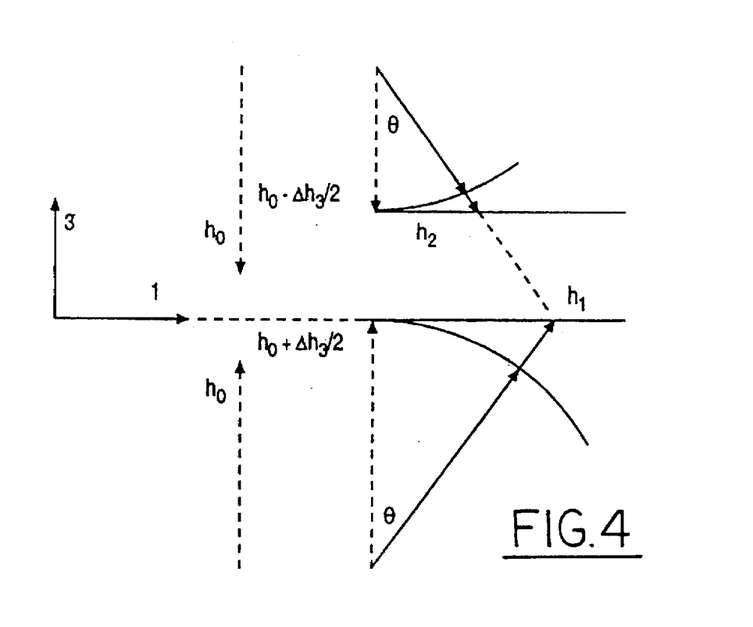
FIG. 4 illustrates the momentum geometry of a double gimbaled momentum wheel.

The present two-momentum wheel array provides three-axis large angle attitude steering in which the two wheels have the momentum vectors parallel in the nominal orientation and in which both wheels are gimbaled about the two orthogonal axes that are mutually normal to the nominal spin axis. The momentum geometry for such an array is shown in FIG. 4. The momentum vectors are constrained to be opposing and are not permitted to pass through zero.

The array momentum equations can be written as follows:

$$h_1 \cos \Theta = h_0 + \Delta h_3/2 \quad (1)$$

$$h_2 \cos \Theta = h_0 - \Delta h_3/2 \quad (2)$$

$$h_1 \sin \Theta + h_2 \sin \Theta = \Delta h_T \quad (3)$$

There are four unknowns from the equations (1)–(3), namely $h_0$, $h_1$, $h_2$ and $\Theta$. Since there are three equations and four unknowns, another constraint must be imposed, or one of the variables specified. In this regard, if the maximum gimbal angle $\Theta$ is specified, substituting $h_1$ and $h_2$ from equations (1) and (2) into equation (3) gives the following:

$$h_0 \geq \Delta h_T/(2 \tan \Theta) \quad (4)$$

while requiring that $h_2$, the smaller wheel momentum magnitude, remain positive.

In this regard, $h_2$ can be defined as follows:

$$h_2 = \Delta h_T/(2 \sin \Theta) - \Delta h_3/(2 \cos \Theta) \geq 0 \rightarrow \tan \Theta \leq \Delta h_T/\Delta h_3 = \Theta \leq \mathrm{Tan}^{-1} [\Delta h_T/\Delta h_3]. \quad (5)$$

Otherwise, when $\Delta h_3$ constrains:

$$h_2 = [h_0 - \Delta h_3/2]/\cos \Theta \geq 0 \rightarrow h_0 \geq \Delta h_3/2. \quad (6)$$

Hence, summarizing, $$h_0 = \max \begin{cases} \Delta h_T/(2\tan\theta) \\ \Delta h_3/2 \end{cases} = \begin{cases} \Delta h_T/(2\tan\theta); \theta \leq \text{Tan}^{-1}[\Delta h_T/\Delta h_3] \\ \Delta h_3/2; \theta > \text{Tan}^{-1}[\Delta h_T/\Delta h_3] \end{cases} \quad (7)$$

The maximum momentum capacity of a wheel is:

$$h_{max} = h_1 = \Delta h_3/(2\cos\theta) + \quad (8)$$

$$\max \begin{cases} \Delta h_T/(2\tan\theta) \\ \Delta h_3/2 \end{cases} = \Delta h_3/(2\cos\theta) +$$

$$\begin{cases} \Delta h_T/(2\tan\theta); \theta \leq \text{Tan}^{-1}[\Delta h_T/\Delta h_3] \\ \Delta h_3/2; \theta > \text{Tan}^{-1}[\Delta h_T/\Delta h_3] \end{cases}$$

If $\Delta h_3$ dominates such that the second inequality constraint holds for a chosen maximum $\theta$, then the maximum momentum $h_{max}$ is independent of $\theta$. However, if $\Delta h_T$ dominates, there is a maximum $\theta$ that will minimize $h_{max}$. The minimizing value is the solution of:

$$\{\tan^2\theta \sin\theta = \Delta h_T/\Delta h_3; \Delta h_T/\Delta h_3 \leq 1.27 \tan \theta = \Delta h_T/\Delta h_3; \Delta h_T/\Delta h_3 > 1.27 \quad (9)$$

where the break at the value that satisfies both relations, i.e., $\Delta h_T/\Delta h_3 = 1.27 = \tan 51.8° = \tan\theta = \tan^2\eta \sin\theta$.

The above sizing relationships for a two-momentum wheel double gimbaled array allows the selection of the size of the momentum wheels and the amount of the angular travel of the wheels in the spacecraft.

The sizing relationship and equations for a momentum bais steering application where both momentum wheels are spun in the same direction are known and do not have to be repeated here.

For a wide envelope of situations, the two-momentum wheel array in accordance with the present invention can more efficiently store momentum and apply torque than a classical three or four-wheel reaction wheel pyramid. The point at which the maximum array momentum of a gimbaled pair of two wheels is equal to the maximum momentum in the array of three wheels in a four-wheel 90° pyramid array for the spherical momentum envelope, is shown by the following equality condition:

$$\frac{\Delta h_3}{2}\left[\frac{1}{\cos\theta} + \frac{1}{\tan\theta}\right] = \frac{\Delta h_3}{2}\left[\frac{\sqrt{2}}{\cos\beta} + \frac{1}{\sin\beta}\right] = 3.4\frac{\Delta h_3}{2}. \quad (10)$$

where the right hand expression has been minimized by using $\beta=41.7°$ from the minimization relation $\tan^3 1/\sqrt{2}$ that applies to the pyramid geometry. In equation (10), $\theta$ is the maximum angle or exclusion that the momentum wheels can be tilted, and $\beta$ is the fixed angle at which the wheel is mounted. When the equation is solved, the momentum in the two arrays are found equal at $\theta=23.5°$. This is the point at which the two-wheel array has the same momentum storage capacity as a three-wheel array.

The momentum management in accordance with the present invention is shown by the following. For a momentum bias attitude control design, one or both wheels are spun in the same direction, while for zero-momentum applications, the wheels are counterspun. For example, typical momentum bias is 50 foot pound seconds (ft-lb-sec). For storage of pitch angular momentum accumulation due to environmental torques, typically 1–10 ft-lb-sec, the magnitude of the wheel speed is adjusted upward or downward slightly. For the counter-spun zero-momentum bias situation, a small differential speed is established. Accumulated roll/yaw angular momentum in axes orthogonal to the wheel nominal spin axis is stored by tilting the wheel a small amount in the spacecraft body. To store a transverse momentum comparable to the pitch example of 10 ft-lb-sec, the wheels should be tilted by 5–10°.

Figure 5:
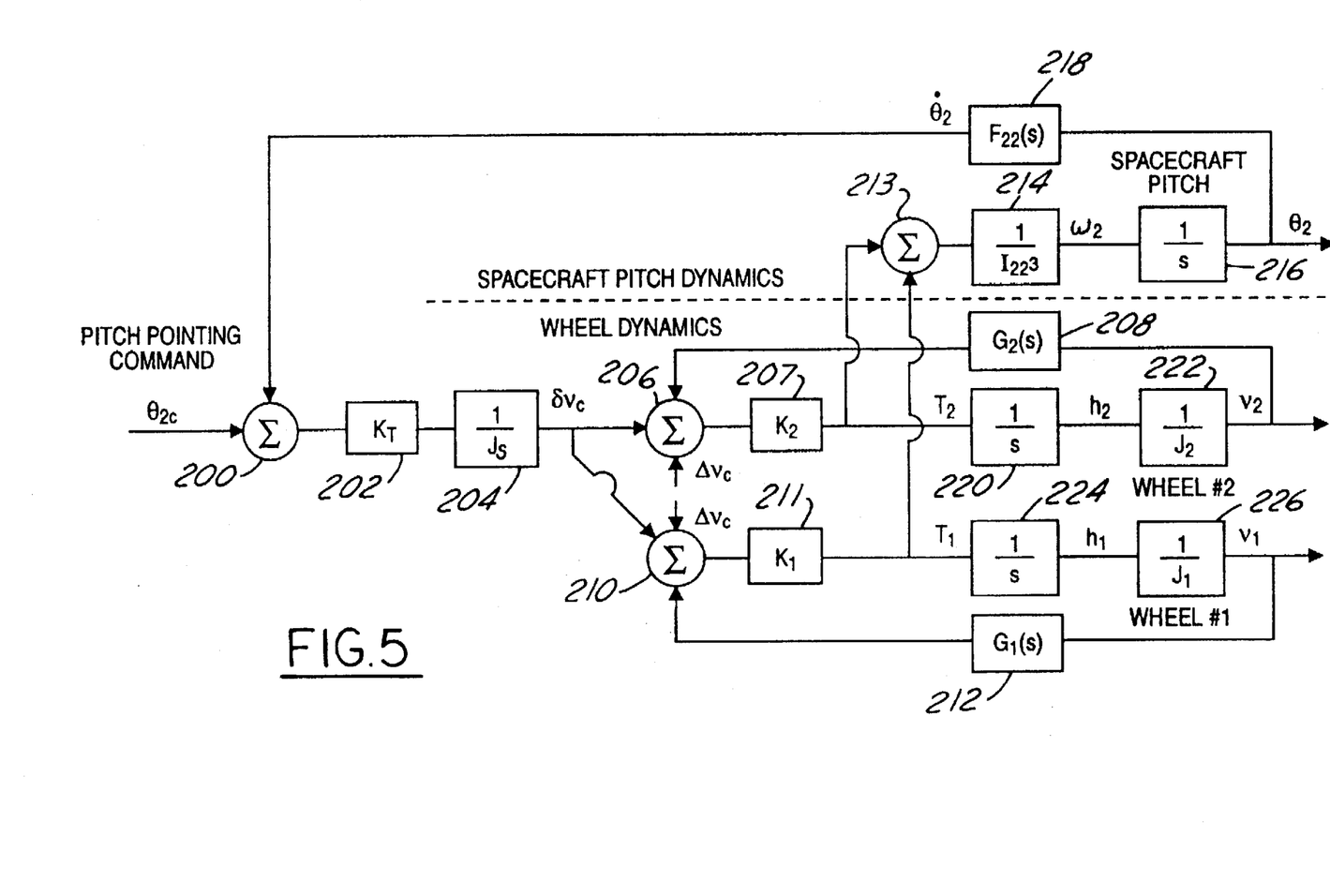
FIG. 5 illustrates a block diagram of a spacecraft pitch attitude and wheel spin control system in accordance with the present invention.
Figure 6:
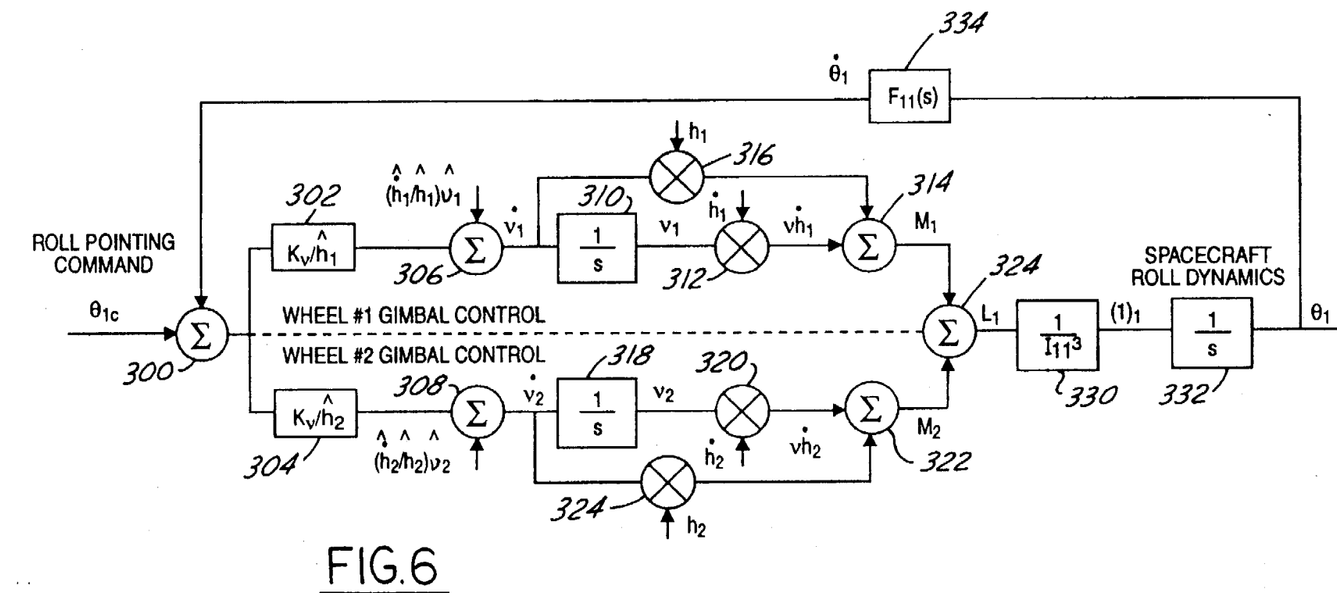
FIG. 6 illustrates a block diagram of a roll attitude and wheel gimbal control system in accordance with the present invention.

Spacecraft control analytical models of the attitude steering in accordance with the present invention are shown in FIGS. 5 and 6. As indicated, the two-wheel array in accordance with the present invention can be used for three-axis attitude steering of the spacecraft. Attitude sensing is assumed provided by some commonly practiced complement of spacecraft attitude sensors, such as gyros, and/or Earth, sun, or star sensors. For pitch steering, the momentum wheel spin motors apply torque to the wheel and react on the spacecraft to provide pitch steering torque.

An analytical model of spacecraft pitch axis dynamics and wheel spin dynamics is shown in FIG. 5. Pitch pointing command $\theta_{2c}$ is generated by the spacecraft control processor (SCP) 50 and is inputted to summing block 200. The output of summing block 200 is multiplied at block 202 by scale factor $K_T$. The torque command $T_{2c}$ is then divided by the nominal wheel inertia J at block 204 to produce $\delta v_c$ which is the necessary change in wheel velocity to achieve the required pitch pointing. Scale factor $K_T$, together with commands $\theta_{2c}$, $1/J_s$ and $\delta v_c$ are generated by the SCP.

The change in wheel velocity is then directed to the first wheel and the second wheel to secure the desired wheel velocities $v_1$ and $v_2$, respectively. As to the second wheel, summing block 206 computes the sum of $\delta v_c$, $\Delta v_c$, and negative feedback provided by $G_2(s)$ 208, where $\Delta v_c$ is the momentum bias command and represents the change in wheel velocity to maintain the proper momentum bias, which may be zero. The output of summing block 206 is multiplied by a scale factor $K_2$ at block 207 to convert the speed command to the second wheel to an appropriate current command. At the same time, as to the first wheel, summing block 210 computes the sum of $\delta v_c$, $\Delta v_c$, and negative feedback provided by $G_1(s)$ 212. The output of summing block 210 is multiplied by a scale factor $K_1$ to convert the speed command to the first wheel to an appropriate current command.

$K_1$ and $K_2$ are the current torque gains for the first and second wheels, respectively. The $G_1(s)$ and the $G_2(s)$ are higher band width compensation controls.

The current commands from the summing blocks 206 and 210 as multiplied by the current/torque gains for both wheels are also both supplied to summing block 213. The output of summing block 213 is then divided by the pitch inertia $I_{22}$ and integrated to produce the angular velocity $\omega_2$. The angular velocity $\omega_2$ is then integrated at block 216 to produce the pitch angle $\theta_2$ of the spacecraft.

The pitch attitude $\theta_2$ is altered at block 218 by compensation controller $F_{22}(s)$ in order to produce the rate of change of the pitch angle $\theta_2$. That measurement of attitude is then provided as negative feedback to summing block 200. This allows the system to make fine adjustments in order to make the pitch angle $\theta_2$ of the spacecraft equal to the pitch pointing command $\theta_{2c}$.

With continued reference to FIG. 5, the current command from block 207 is multiplied by the spin torque $T_2$ for the second wheel and integrated at block 220 to produce momentum $h_2$ of the second wheel. The momentum $h_2$ is then divided at block 222 by the corresponding energy wheel inertia $J_2$ to produce velocity $v_2$. As a result, the second wheel is spun at the velocity $v_2$.

At the same time, the current command resulting from block 211 is multiplied by the torque $T_1$ for the first wheel. That signal is then integrated at block 224 to produce momentum $h_1$ of the first wheel. The momentum $h_1$ is then divided by the corresponding energy wheel inertia $J_1$ for the first wheel at block 226 to produce velocity $v_1$. The first wheel is then spun at that speed.

To implement roll/yaw attitude steering, one or both wheels are tilted about their transverse axis gimbals. This rotates the spin momentum vectors in the body and thus, observing conservation of angular momentum, imparts momentum to the spacecraft body. An analytical model for the transverse axis control is seen in FIG. 6, which is a block diagram of the roll attitude and wheel gimbal control system for the spacecraft. Since the yaw attitude and wheel control is identical to the roll attitude and wheel control, it does not need to be shown separately.

Referring to FIG. 6, the roll pointing command $\theta_{1c}$ is generated by the SCP and applied as an input to summing block 300. The output from summing block 300 is then fed to gain multiplier 302 for the first wheel and gain multiplier 304 for the second wheel.

The outputs from blocks 302 and 304, respectively, are then fed to summing blocks 306 and 308 for the first and second wheels, respectively. Summing blocks 306 and 308 add the product of the estimated rate of momentum change $\hat{h}_1$ divided by the estimated wheel momentum $\hat{h}_1$ multiplied by the estimated angle of wheel tilt as $\hat{v}_1$ to produce the rate of wheel tilt as $\dot{v}$ for each wheel. These are shown by the symbols $\dot{v}_1$ and $\dot{v}_2$ in FIG. 6. The summing at these feed forward compensation terms at 306 and 308 may not be necessary in less agile or lower precision applications. The two rates of wheel tilts for the two wheels are then separately integrated at blocks 310 and 318 to produce the tilt angles for the two wheels, $v_1$ and $v_2$, respectively.

The wheel tilt angles $v_1$ and $v_2$ are multiplied at blocks 312 and 320 by the rates of change in momentum due to wheel torque, namely $\dot{h}_1$ and $\dot{h}_2$, respectively. The rate of change in momentum due to wheel torque is produced by the pitch control dynamics. Blocks 316 and 324 multiply the rates of wheel tilt $\dot{v}_1$ and $\dot{v}_2$ by the corresponding wheel momentums $h_1$ and $h_2$, respectively, to produce the desired control torque. The results are then fed forward to summing blocks 314 and 322, respectively.

The output of summing block 314 is the torque $M_1$ produced by the first wheel. Similarly, the output of summing block 322 is the torque $M_2$ produced by the second wheel. The torque outputs $M_1$ and $M_2$ are then combined at summing block 324 to produce a pointing control torque $L_1$.

The pointing torque $L_1$ is divided by the roll inertia $I_{11}$ at block 330 and then integrated at block 332. The result produced is the roll pointing angle $\theta_1$ for the spacecraft. Still referring to FIG. 6, the roll angle of the spacecraft $\theta_1$ is also fed back through block 334 which produces the rate of roll angle change $\dot{\theta}_1$. This input is then fed as a negative feedback to summing block 300. This allows the system to make fine adjustments in order to make the roll angle $\theta_1$ of the spacecraft equal to the roll pointing command $\theta_{1c}$.

When there is no momentum bias, steering may be affected by gimbaling one wheel, or twice the authority may be obtained by gimbaling the two wheels in the same direction as a pair. When a momentum bias is employed by spinning both wheels in the same direction, the wheels may be gimbaled as a locked pair for maximum torque authority, or singly for finer pointing resolution.

To illustrate the two-wheel zero-momentum case with a numerical example, let each wheel have momentum H=50 ft-lb-sec and let the spacecraft have roll and yaw moments of inertia $I_{11}=I_{33}=4,000$ slug-ft$_2$. Gimbaling the wheels about the yaw axis by an angle of 5.0° will induce spacecraft roll rates of 0.062 and 0.125°/second when gimbaled singly or a pair, respectively. The lower rate is satisfactory, for example, for sun-nadir yaw steering. The higher rate is suitable for a large angle Earth acquisition attitude maneuvers.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. An attitude steering and momentum management system for a spacecraft having a body and a first axis, said system comprising:

a first active momentum wheel disposed within said body and rotatable about a first spin axis substantially co-aligned with said first axis, wherein rotation of said first momentum wheel produces a first momentum directed along said first spin axis;

a second active momentum wheel disposed within said body and rotatable about a second spin axis substantially co-aligned with said first axis, wherein rotation of said second momentum wheel produces a second momentum directed along said second spin axis;

first mounting means for mounting said first momentum wheel in said body, said first mounting means controlling tilting of said first momentum wheel about two axes orthogonal to said first spin axis;

second mounting means for mounting said second momentum wheel in said body, said second mounting means controlling tilting of said second momentum wheel about two axes orthogonal to said second spin axis; and a processor in communication with said first and second momentum wheels and said first and second mounting means for controlling the tilting of said first and second spin axes, the direction of rotation of said first and second momentum wheels and the rotational speed of said first and second momentum wheels, wherein said processor controls the rotational speed, direction of rotation and tilting of said first and second momentum wheels for desired orbit attitude steering selected from the group consisting of momentum-bias steering and zero-momentum steering.

2. The system of claim 1 wherein said first and second mounting means each comprise gimbal means.

3. The system of claim 1 wherein said first and second mounting means each comprise two-degree-of-freedom flexible pivot means.

4. The system of claim 1 wherein said first and second mounting means each comprise jackscrew mechanisms.

5. The system of claim 1 wherein said first and second mounting means each control tilting of its respective momentum wheel within the range from 0°–45°.

6. A control system for a spacecraft including attitude steering and momentum management functions, the system comprising:

a body having three mutually orthogonal axes including a pitch axis, a roll axis, and a yaw axis;

a first active gimbaled momentum wheel disposed within the body and reversibly rotatable about a first spin axis substantially co-aligned with the pitch axis, wherein rotation of said first gimbaled momentum wheel produces a first momentum directed along the first spin axis;

a second active gimbaled momentum wheel disposed within the body and reversibly rotatable about a second spin axis substantially co-aligned with the pitch axis, wherein rotation of said second gimbaled momentum wheel produces a second momentum directed along the second spin axis; and a processor in communication with said first and second gimbaled momentum wheels for controlling alignment of the first and second spin axes to effect attitude steering, and the speed and direction of rotation of said first and second gimbaled momentum wheels to effect momentum management, said first and second momentum wheels being gimbaled by jackscrew mechanisms and said first and second spin axes being tiltable within the range of 0°–45° from the pitch axis.

7. The control system as set forth in claim 6 wherein said attitude steering is selected from the group comprising momentum-bias steering and zero-momentum steering.

8. A method of securing multiple orbit geometries and varying degrees of attitude steering of a spacecraft from a two active momentum wheel array, said method comprising:

a) rotating a first of said momentum wheels in a first prespecified direction and at a first prespecified speed around a first prespecified spin axis;

b) rotating the second of said momentum wheels in a second prespecified direction and at a second prespecified speed around a second prespecified spin axis which is substantially co-aligned with the first spin axis;

c) tilting said first momentum wheel a prespecified amount from said first spin axis;

d) tilting said second momentum wheel a prespecified amount from said second spin axis;

e) measuring spacecraft roll and pitch attitude using spacecraft sensors and forming corresponding roll and pitch measurement signals;

f) producing command roll and pitch attitude control signals for an attitude steering maneuver;

g) generating torque commands;

h) applying said torque commands with maneuver sequencing logic to alter the attitude of said spacecraft.

9. The method as set forth in claim 8 wherein said tilting of said first and second momentum wheels is accomplished by jackscrew mechanisms.

10. The method as set forth in claim 8 wherein said first and second momentum wheels are tilting within the range from 0° to 45°.

11. The method as set forth in claim 8 wherein said attitude steering is selected from the group comprising momentum-bias steering and zero-momentum steering.

12. The method as set forth in claim 8 wherein said first and second momentum wheels are each double gimble control movement gyros.

* * * * *